Figure 1:
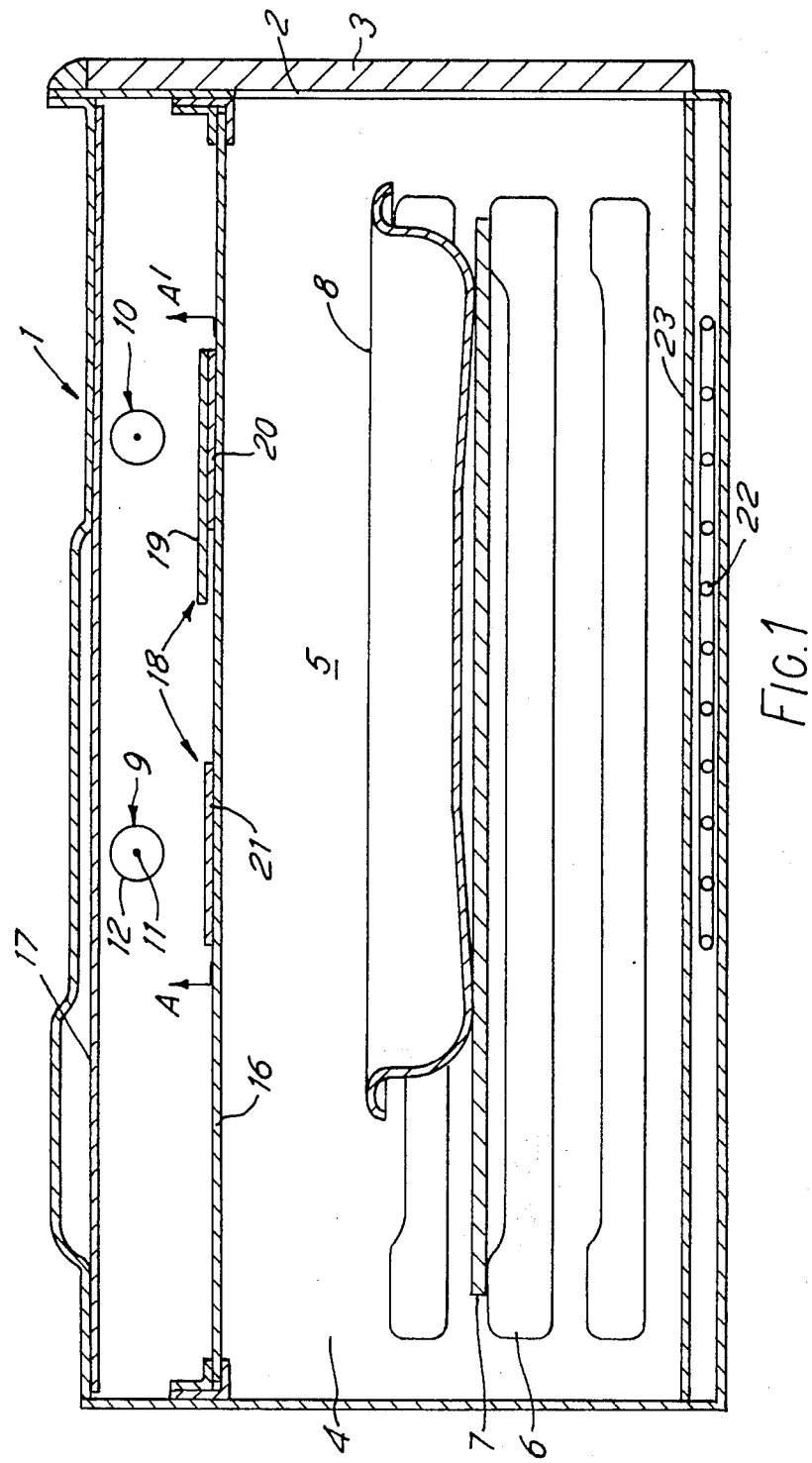

United States Patent [19]

Tsisios

[11] Patent Number: 4,761,529
[45] Date of Patent: Aug. 2, 1988

[54] GRILLING OR BROWNING APPARATUS SUITABLE FOR USE IN A MICROWAVE OR CONVECTION OVEN

[75] Inventor: Michael N. Tsisios, Famagusta, Cyprus

[73] Assignee: Thorn EMI Patents Limited, Hayes, England

[21] Appl. No.: 63,948

[22] Filed: Jun. 19, 1987

[30] Foreign Application Priority Data

Jun. 21, 1986 [GB] United Kingdom ................. 8615201

[51] Int. Cl.⁴ ............................................. H05B 6/80
[52] U.S. Cl. ...................... 219/10.55 B; 219/10.55 E; 219/10.55 D; 219/400; 126/21 A
[58] Field of Search .................. 219/10.55 B, 10.55 F, 219/10.55 D, 10.55 E, 10.55 R, 400, 341, 342, 343, 350, 352; 126/21 A

[56] References Cited

U.S. PATENT DOCUMENTS

| 2,368,026 | 1/1945 | Jepson | 99/389 |
| 2,920,174 | 1/1960 | Haagensen | 219/10.55 F |
| 3,304,406 | 2/1967 | King | 219/411 |
| 3,334,620 | 8/1967 | Werth | 126/41 |
| 3,355,574 | 11/1967 | Bassett, Jr. | 219/464 |
| 3,941,044 | 3/1976 | Goltsos | 99/391 |
| 4,477,706 | 10/1984 | Mittelsteadt | 219/10.55 B |
| 4,480,164 | 10/1984 | Dills | 219/10.55 F X |

FOREIGN PATENT DOCUMENTS

| 0174774 | 3/1986 | European Pat. Off. . | |
| 1565339 | 2/1970 | Fed. Rep. of Germany . | |
| 2154748 | 5/1972 | Fed. Rep. of Germany . | |
| 3035712 | 4/1982 | Fed. Rep. of Germany . | |
| 51-16661 | 5/1976 | Japan | 219/10.55 B |
| 55-23828 | 2/1980 | Japan | 219/10.55 B |
| 56-108028 | 8/1981 | Japan | 219/10.55 E |
| 394980 | 7/1933 | United Kingdom . | |
| 448971 | 6/1936 | United Kingdom . | |
| 664411 | 1/1952 | United Kingdom . | |
| 908793 | 10/1962 | United Kingdom . | |
| 2152790 | 8/1975 | United Kingdom . | |
| 2132060 | 6/1984 | United Kingdom . | |
| 2160400 | 12/1985 | United Kingdom . | |

Primary Examiner—Philip H. Leung
Attorney, Agent, or Firm—Fleit, Jacobson, Cohn & Price

[57] ABSTRACT

A grilling compartment includes two tungsten-halogen lamps emissive of infra-red radiation and separated from a grilling area by a ceramic protective screen. Infra-red radiation emitted by the lamps passes through the protective screen to irradiate the grilling area to grill food placed therein. A metallic mesh screen is also provided between the lamps and the grilling area, only in close proximity to the lamps and configured to provide a substantially uniform distribution of intensity of infra-red radiation over substantially the whole of the grilling area.

10 Claims, 3 Drawing Sheets

GRILLING OR BROWNING APPARATUS SUITABLE FOR USE IN A MICROWAVE OR CONVECTION OVEN

This invention relates to apparatus for grilling or browning food and in particular to such apparatus including one or more lamps, such as tungsten-halogen lamps, emissive of infra-red radiation to effect the grilling or browning.

The use of tungsten-halogen lamps as a source of infra-red radiation in a grill, or in a microwave oven wherein it can be used for browning food cooked by the microwave energy, has been previously proposed in U.K. Pat. No. 2132060. Each lamp, as described in that patent, comprises a halogenated, tubular quartz envelope within which a tungsten filament is supported.

The use of tungsten-halogen lamps in cooking apparatus, particularly cooking hobs, has been found to be highly efficient and the lamps have been found to have a usefully rapid thermal response.

However, the lamps tend to produce a non-uniform spatial distribution of intensity of infra-red radiation and this can cause disadvantages, if the lamps are used for grilling or browning, because the non-uniform spatial distribution of intensity can cause non-uniform grilling or browning of the food.

In U.K. Pat. No. 2152790, a microwave oven includes a turntable for supporting food to be cooked by microwave energy and two tungsten-halogen lamp browning units, one being positioned in the roof of the oven cavity and the other in a side wall thereof. Each unit is provided with a metal screen to protect the lamps from the microwave energy, and the infra-red radiation emitted from the lamps is utilised to brown the food cooked by the microwave energy. However, this arrangement would also result in non-uniform distribution of the infra-red radiation over the food, if the turntable was not used.

Furthermore, it has been found that the predominant wavelength of radiation emitted by the lamps, i.e. approximately 1.2 $\mu$m, is not particularly conducive to achieving good results when used for grilling or browning purposes.

It is therefore an object of the present invention to provide apparatus for grilling or browning food, which apparatus substantially alleviates the above-mentioned problems associated with the use of infra-red-emissive lamps for grilling/browning purposes.

Accordingly, the present invention provides apparatus for grilling or browning food, said apparatus including at least one lamp emissive of infra-red radiation and positioned to irradiate an area, within which food to be grilled or browned can be placed, and screening means positioned between said at least one lamp and said area, said screening means consisting of a metallic material having apertures therein and configured to provide a substantially uniform distribution of intensity of said infra-red radiation over substantially the whole of said area, said metallic material being located only in close proximity to said at least one lamp.

The screening means may consist of, for example a separate mesh of aluminum, nickel alloy, or any other suitable metal or of a mesh screen-printed onto a surface of a ceramic plate positioned between the lamp or lamps and the grilling or browning area.

By locating the screening means only in close proximity to the lamps, the metallic material can be heated by the lamps to a sufficiently high temperature to cause it to radiate at a wavelength more suitable for grilling or browning, i,e. at a wavelength longer than 1.2 $\mu$m, for example, 3 $\mu$m or more.

Figure 2:
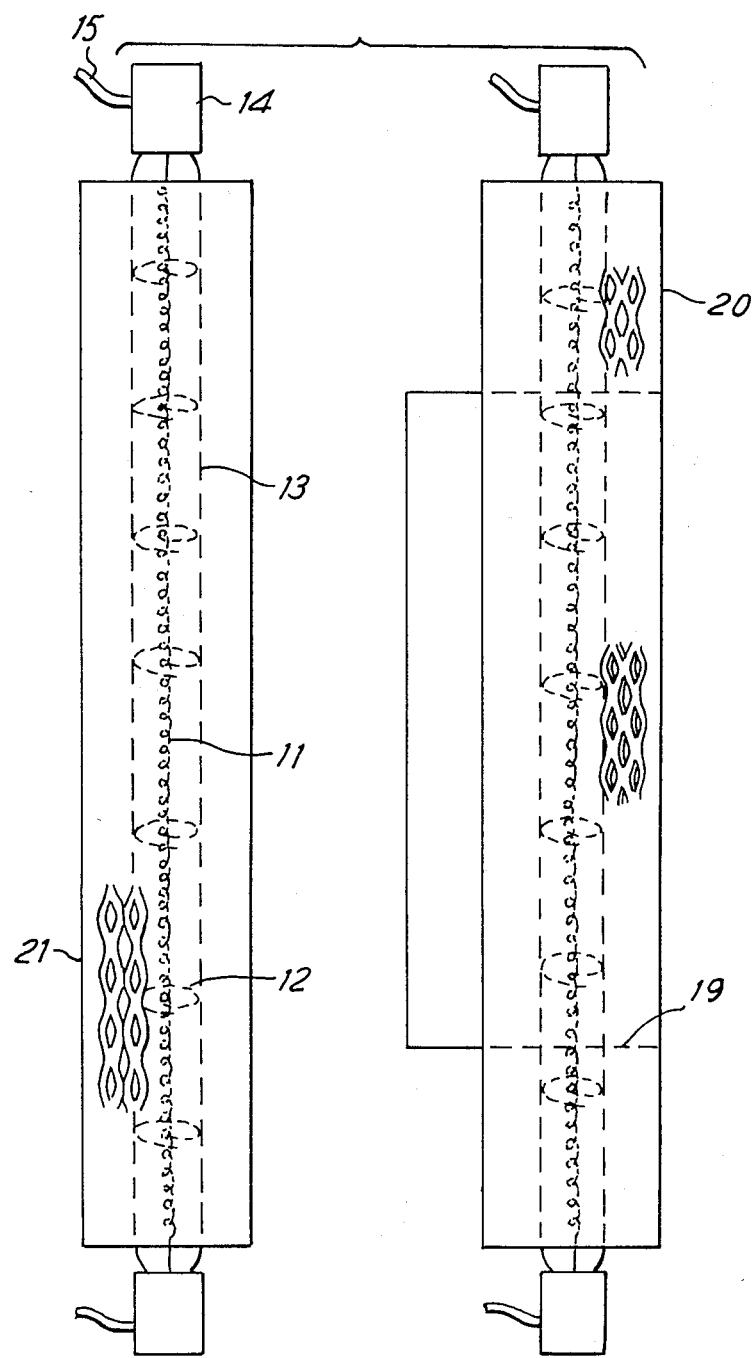
Figure 3:
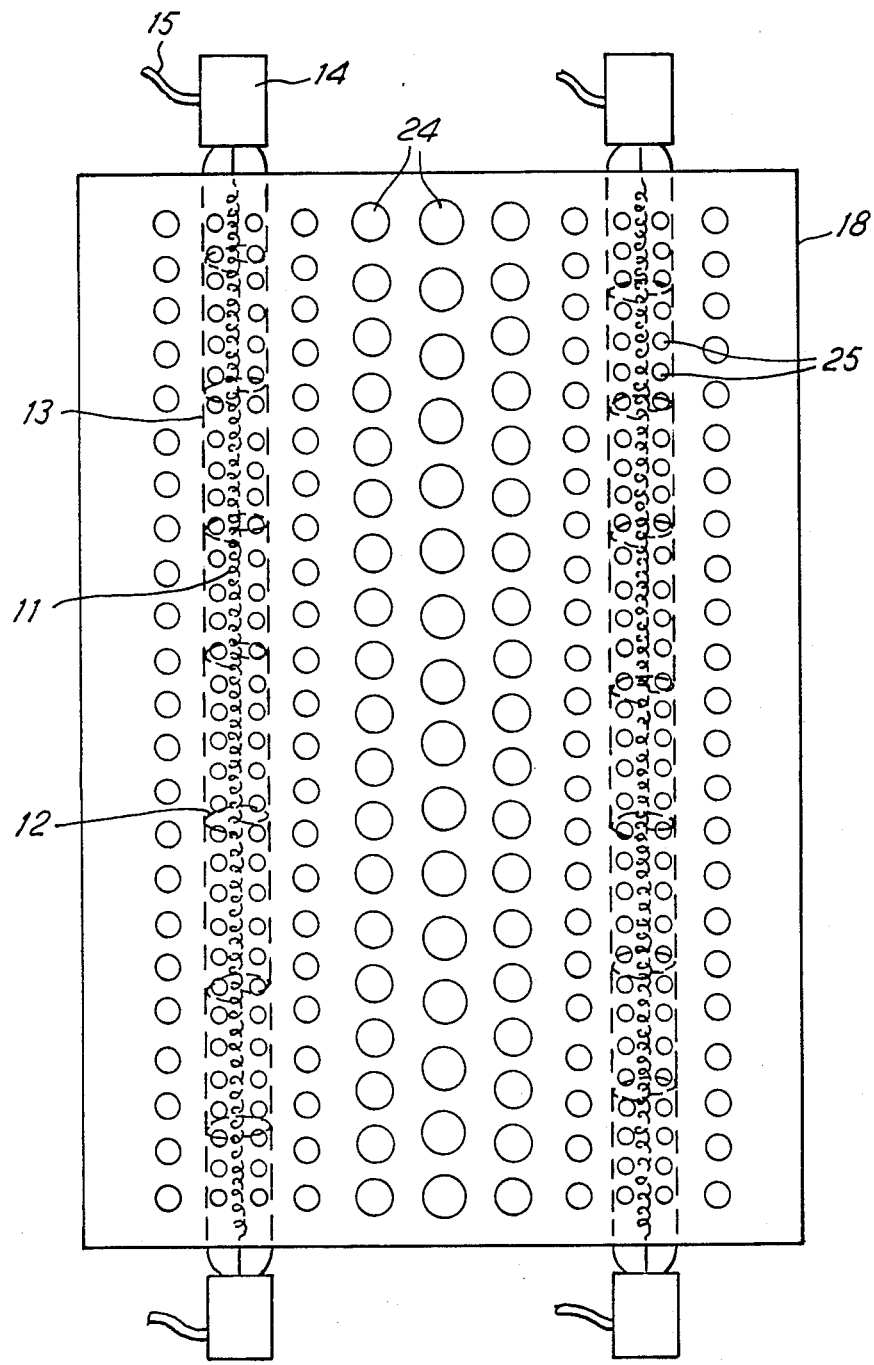

The invention will now be further described by way of example only with reference to the accompanying drawings, wherein:

FIG. 1 shows schematically a cross-sectional view of one embodiment of the invention, FIG. 2 shows a view along A—A$^1$, as shown in FIG. 1, and FIG. 3 shows a schematic view of an alternative embodiment to that shown in FIGS. 1 and 2.

FIG. 1 shows a grilling compartment 1 having a front opening 2 closed by a door 3. Side walls 4 of the grilling area 5 are formed with ledges 6 for supporting a shelf 7 at a selectable height within the area 5.

A cooking utensil 8, such as a grill pan, can thus be placed on the shelf 7 in the area 5, to enable food retained in the utensil 8 to be grilled.

Grilling of the food is effected by a number, preferably two, tungsten-halogen lamps 9,10, emissive of infrared-radiation and mounted in the upper region of the compartment 1. Each lamp comprises a linear or coiled coil tungsten filament 11 supported, by spaced spiral supports 12 (shown in FIG. 2), within a halogenated, tubular quartz envelope 13, which is sealed at each end by a pinch seal (not shown). FIG. 2 shows a ceramic end cap 14 enclosing each pinch seal, from which an electrical connection 15 is emergent for connection to an electrical power supply. The end caps 14 protect the pinch seals and enable the lamps to be removably mounted in suitable brackets (not shown), thereby providing simple replacement of the lamps, when necessary.

The lamps 9,10 are separated from the grilling area 5 by a protective screen 16, preferably made of a clear glass ceramic material, which protects the lamps from mechanical damage and/or from soiling by food particles emanating from food during grilling. On the side of the lamps 9,10 remote from the protective screen 16 is a reflector 17, which preferably consists of an aluminium planar sheet.

Infra-red radiation emitted by the lamps 9,10 therefore passes through the protective screen 16 into the grilling area 5 either directly or after reflection by the reflector 17. However, due to the nature of the lamps, the intensity of infra-red radiation over the area 5 tends to be greater in the region directly below the filaments 11, which can produce non-uniform grilling of food in the area 5.

To mitigate the non-uniformity of the grilling by the lamps, a screen 18, which may consist of a metallic mesh, such as aluminium or nickel alloy, is positioned over the surface of the protective screen 16 adjacent the lamps 9,10.

The screen 18, which can be seen more clearly in FIG. 2, consists in this embodiment of three pieces 19,20,21 of metallic mesh positioned and configured relative to the lamps 9,10 to produce a substantially uniform distribution of intensity of infra-red radiation emitted by the lamps over substantially whole of the area 5. To this end, the screen 18 provides specular emission of the infra-red radiation, thereby diffusing it over the area 5.

It has been found preferable to position mesh pieces 20 and 21, which are preferably of equal length, so that the respective lamp filament coincides with the longitudinal line of symmetry of the mesh piece positioned therebelow. Preferably also the length, parallel to the lamp filament, of the mesh piece 20 is twice that of the mesh piece 19, and one-quarter of the length of piece 20 protrudes from either end of the piece 19. The mesh piece 19 also preferably protrudes from the side of the mesh 20 by an amount approximately half of the width of piece 20.

It will of course be appreciated that, whilst the above-described screen 18 provides optimum uniformity of grilling for this particular embodiment, different sizes and positions of the screen may be required for other embodiments, depending on the positioning of the lamps relative to each other, the reflector 17 and/or the screen 18, as well as on the output, number, etc of the lamps themselves.

In the described embodiment, two tunsten-halogen lamps each with an output of 1500 W are provided, but a different number and/or output of the lamps may be used if required.

As one alternative to a separate mesh, the mesh may be screen-printed onto the surface of the protective screen 16 facing the lamps 9, 10.

Another alternative is shown in FIG. 3, wherein like parts are labelled with like reference numerals with respect to FIGS. 1 and 2. The screen 18 may consist of a single metallic sheet formed with holes 24 of different sizes and/or spacing to provide the uniform distribution so that for example smaller holes 25 may be provided directly beneath the lamp filaments 11 than further to either side of the filaments 11. This variable hole size screen could also be screen-printed onto the protective screen 16.

As another alternative, the mesh may take the form of a trough positioned around the underside of each lamp.

The grilling compartment 1 may form part of a stand-alone or built-in cooker, having for example a cooking hob above it and an oven compartment below it.

Alternatively, the compartment 1 may be used as a microwave oven cavity by providing a microwave source (not shown) and suitable microwave waveguides into the area 5. In this embodiment, the lamps 9,10 can be used for browning food cooked by the microwave energy, and the screen 15 can be configured for use as a microwave screen to inhibit microwave energy from reaching the lamps, as well as providing uniform browning.

A conventional sheathed electrical resistance heating element 22 may be embedded in base 23 of the compartment 1 to provide cooking by convection of the food in area 5, the heat from element 22 being conveyed into the area 5 by thermal conduction through the base 23.

A control arrangement may be used to permit individual energisation of the lamps, so that only a portion of the area 5 is irradiated, and/or energisation of both or all the lamps in various series and/or parallel configurations to provide a number of discrete outputs of the lamps. Alternatively, an energy regulator or any other suitable control may be employed to control the output of the lamps.

The tungsten-halogen lamps utilised in the preferred embodiment emit infra-red radiation in a wavelength range of approximately 0.8–5 $\mu m$, but with a peak at approximately 1.2 $\mu m$, which has been found not to be conducive to effect good grilling or browning.

However, it has also been found that infra-red radiation emitted from the lamps can be absorbed, primarily by the metallic screen 18, and, if the mesh is only located in close proximity to the lamps and does not cover the whole grilling/browning area, it can reach a sufficiently high temperature to radiate at longer wavelengths of approximately 3 $\mu m$ or more, which wavelengths are more suitable to effect grilling or browning. The longer wavelength radiation thus conducts through the protective screen 16, which is preferably made from a suitable glass ceramic, and into the grilling/browning area 5, to provide grilling/browning of food placed therein.

The protective screen 16, when formed of, for example, a glass ceramic material, may be shaped into a linear Fresnel lens system to avoid internal reflection of infra-red radiation within the screen.

I claim:

1. An apparatus for grilling or browning food, the apparatus comprising a compartment having a region in which food to be grilled or browned can be placed; at least one infra-red emissive lamp having a longitudinal axis and being positioned to heat said region and screening means located between said lamp and said region and being effective to provide a substantially uniform distribution of heat in said region, wherein the screening means comprises a first sheet of a metallic mesh material arranged lengthwise with respect to the lamp and a second sheet of a metallic mesh material adjacent to said first sheet of a metallic mesh material, the second sheet being shorter than, and arranged centrally with respect to the ends of, said first sheet, the screening means being located in sufficiently close proximity to said at least one lamp as to absorb radiation produced by the lamp and re-radiate said radiation at a wavelength which is greater than that produced by the lamp and is more conducive to browning or grilling food.

2. An apparatus according to claim 1 wherein said second sheet of a metallic mesh material is wider than said first sheet of a metallic mesh material.

3. An apparatus according to claim 1 or claim 2 including a sheet of an infra-red transmissive material positioned between said lamp and said region.

4. An apparatus for grilling or browning food according to claim 3, further including an electrical resistance heating element to effect convection cooking of food placed in said region of said compartment.

5. An apparatus for grilling or browning food according to claim 3, further including a source of microwave energy and means for directing microwave energy from the source into said region of said compartment.

6. An apparatus for grilling or browning food, the apparatus comprising a compartment having a region in which food to be grilled or browned can be placed; at least one infra-red emissive lamp having a longitudinal axis and being positioned to heat said region and screening means located between said lamp and said region and being effective to provide a substantially uniform distribution of heat in said region, wherein the screening means comprises a sheet of a metallic material having a plurality of apertures, the apertures having progressively different sizes and or spacings depending on the relative transverse distances of the apertures from the longitudinal axis of the lamp, and the screening means being located in sufficiently close proximity to said lamp as to absorb radiation produced by the lamp and re-radiate said radiation at a wavelength which is greater than that produced by the lamp and is more conductive to browning or grilling food.

7. An apparatus according to claim 6 further including a sheet of a ceramic material positioned between said at least one lamp and said region.

8. An apparatus according to claim 7 wherein said sheet of a metallic material is formed by screen printing on a surface of said sheet of a ceramic material.

9. An apparatus for grilling or browning food according to any one of claims 1, 2 and 6-8, further including an electrical resistance heating element to effect convection cooking of food placed in said region of said compartment.

10. An apparatus for grilling or browning food according to any one of claims 1, 2 and 6-8, further including a source of microwave energy and means for directing microwave energy from the source into said region of said compartment.

* * * * *